United States Patent
Li et al.

(10) Patent No.: US 12,439,419 B2
(45) Date of Patent: Oct. 7, 2025

(54) CHANNEL MONITORING METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 431 days.

(21) Appl. No.: 17/971,745

(22) Filed: Oct. 24, 2022

(65) Prior Publication Data

US 2023/0043850 A1    Feb. 9, 2023

Related U.S. Application Data

(63) Continuation of application No. PCT/CN2020/087250, filed on Apr. 27, 2020.

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
CPC ............................. H04W 72/23; H04L 5/0053
See application file for complete search history.

(56) References Cited

U.S. PATENT DOCUMENTS

| | | | |
|---|---|---|---|
| 2019/0313383 A1* | 10/2019 | Xiong | ................... H04W 16/14 |
| 2021/0022079 A1 | 1/2021 | Shen | |
| 2021/0168715 A1 | 6/2021 | Huang | |
| 2021/0258962 A1 | 8/2021 | Quan | |
| 2022/0201605 A1* | 6/2022 | Yang | ................. H04W 72/1263 |
| 2022/0224486 A1* | 7/2022 | Luo | ................... H04W 52/0235 |
| 2023/0024647 A1 | 1/2023 | Kuang | |
| 2023/0108344 A1 | 4/2023 | Shen | |

FOREIGN PATENT DOCUMENTS

| | | |
|---|---|---|
| CN | 110546982 A | 12/2019 |
| EP | 3609109 A1 | 2/2020 |
| EP | 3771256 A1 | 1/2021 |
| EP | 3836685 A1 | 6/2021 |

(Continued)

OTHER PUBLICATIONS

Huawei et al. "Further discussion on the impact of DCI-based PDCCH skipping" 3GPP TSG-RAN2 Meeting#106 R2-1906904, May 17, 2019 (May 17, 2019), section 2, and figures 1-2.

(Continued)

*Primary Examiner* — Ronald B Abelson
(74) *Attorney, Agent, or Firm* — PERKINS COIE LLP

(57) ABSTRACT

A channel monitoring method is provided. The method includes that: a terminal device receives first indication information. The first indication information is used for determining at least one Physical Downlink Control Channel (PDCCH) search space of skipping PDCCH monitoring and/or a duration of skipping PDCCH monitoring for the terminal device.

15 Claims, 12 Drawing Sheets

(56) References Cited

FOREIGN PATENT DOCUMENTS

WO         2019183848 A1    10/2019
WO         2020029798 A1    2/2020

OTHER PUBLICATIONS

Huawei et al. "Discussion on the impact of WUS to the C-DRX" 3GPP TSG-RAN2 Meeting#106 R2-1906903, May 17, 2019 (May 17, 2019), sections 2-3.
CATT. "Report on [105bis#27][NR/Power Saving]—PDCCH skipping" 3GPP TSG-RAN WG2 Meeting #106 R2-1905665, May 17, 2019 (May 17, 2019), section 2.
OPPO. "SR triggering and DRX operation" 3GPP TSG-RAN WG2 Meeting #106 R2-1905606, May 17, 2019 (May 17, 2019), entire document.
International Search Report in the international application No. PCT/CN2020/087250, mailed on Jan. 27, 2021.
Written Opinion of the International Search Authority in the international application No. PCT/CN2020/087250, mailed on Jan. 27, 2021.
Supplementary European Search Report in the European application No. 20933653.6, mailed on Apr. 24, 2023. 10 pages.
First Office Action of the European application No. 20933653.6, issued on Nov. 14, 2023. 4 pages.

\* cited by examiner

CHANNEL MONITORING METHOD, ELECTRONIC DEVICE, AND STORAGE MEDIUM

CROSS-REFERENCE TO RELATED APPLICATION

The present disclosure is a US continuation application of International Application No. PCT/CN2020/087250 filed on Apr. 27, 2020. The disclosure of the above PCT application is hereby incorporated by reference in its entirety.

BACKGROUND

In a related art, when a terminal device monitors a channel, how to effectively monitor the channel while reducing the power consumption of the terminal device has not been clarified.

SUMMARY

The application relates to the technical field of wireless communication, and in particular, to a channel monitoring method, an electronic device, and a storage medium.

The embodiments of the application provide a channel monitoring method, an electronic device, and a storage medium, so that a terminal device can effectively monitor a channel while reducing the power consumption.

In a first aspect, an embodiment of the application provides a channel monitoring method, which may include that: a terminal device receives first indication information. The first indication information is used for determining at least one Physical Downlink Control Channel (PDCCH) search space of skipping PDCCH monitoring and/or a duration of skipping PDCCH monitoring for the terminal device.

In a second aspect, an embodiment of the application provides a channel monitoring method, which may include that: a network device sends first indication information. The first indication information is used for determining at least one PDCCH search space of skipping PDCCH monitoring and/or duration of skipping PDCCH monitoring for the terminal device.

In a third aspect, an embodiment of the application provides a terminal device. The terminal device includes: a receiving unit, configured to receive the first indication information. The first indication information is used for determining at least one PDCCH search space of skipping PDCCH monitoring and/or duration of skipping PDCCH monitoring for the terminal device.

In a fourth aspect, an embodiment of the application provides a network device. The network device may include: a sending unit, configured to send first indication information. The first indication information is used for determining at least one PDCCH search space of skipping PDCCH monitoring and/or duration of skipping PDCCH monitoring for the terminal device.

In a fifth aspect, an embodiment of the application provides a terminal device, which may include a processor and a memory configured to store a computer program that can run on the processor. The processor is configured to execute the operations of the channel monitoring method executed by the abovementioned terminal device when running the computer program.

In a sixth aspect, an embodiment of the application provides a network device, which may include a processor and a memory configured to store a computer program that can run on the processor. The processor is configured to execute the operations of the channel monitoring method executed by the abovementioned network device when running the computer program.

In a seventh aspect, an embodiment of the application provides a chip, which may include a processor, configured to call and run a computer program in a memory to enable a device installed with the chip to execute the channel monitoring method executed by the abovementioned terminal device.

In an eighth aspect, an embodiment of the application provides a chip, which may include a processor, configured to call and run a computer program in a memory to enable a device installed with the chip to execute the channel monitoring method executed by the abovementioned network device.

In a ninth aspect, an embodiment of the application provides a storage medium, which stores an executable program. The executable program implements the channel monitoring method executed by the abovementioned terminal device when being executed by a processor.

In a tenth aspect, an embodiment of the application provides a storage medium, storing an executable program. The executable program implements the channel monitoring method executed by the abovementioned network device when being executed by a processor.

In an eleventh aspect, an embodiment of the application provides a computer program product, including computer program instructions. The computer program instructions enable a computer to execute the channel monitoring method executed by the abovementioned terminal device.

In a twelfth aspect, an embodiment of the application provides a computer program product, including computer program instructions. The computer program instructions enable a computer to execute the channel monitoring method executed by the abovementioned network device.

In a thirteenth aspect, an embodiment of the application provides a computer program. The computer program enables a computer to execute the channel monitoring method executed by the abovementioned terminal device.

In a fourteenth aspect, an embodiment of the application provides a computer program. The computer program enables a computer to execute the channel monitoring method executed by the abovementioned network device.

DETAILED DESCRIPTION

Figure 1:
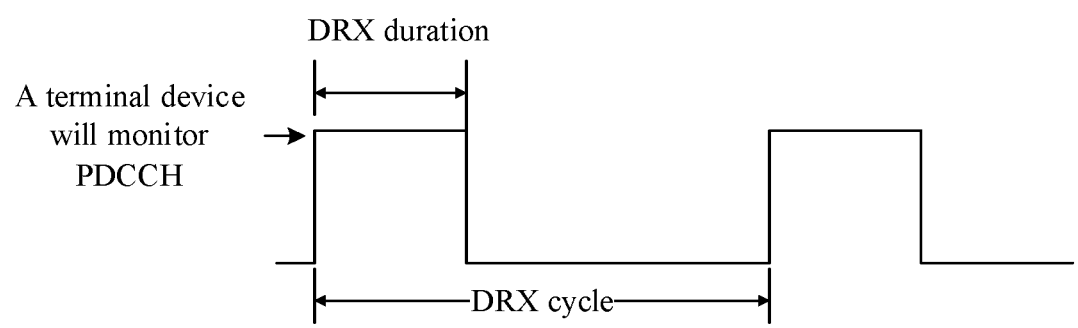
FIG. 1 illustrates an optional schematic diagram of a discontinuous reception cycle of some embodiments of the application.

The embodiments of the application provide the channel monitoring method, the electronic device, and the storage medium. The method includes that: the terminal device receives the first indication information. The first indication information is used for determining at least one PDCCH search space of skipping PDCCH monitoring and/or a duration of skipping PDCCH monitoring for the terminal device. Thus, the terminal device executes PDCCH skipping in the at least one PDCCH search space determined based on the first indication information, which can not only reduce the power consumption and the electric energy of the terminal device, but also give consideration to the scheduling requirements of the network device on different services by monitoring the PDCCH in part PDCCH search spaces for transmitting a specific service, so as to realize flexible scheduling of the network device to the service.

In order to provide a more detailed understanding of the features and technical contents of the embodiments of the disclosure, the implementation of the embodiments of the application will be described in detail below with reference to the accompanying drawings, and the accompanying drawings are for illustrative purposes only and are not intended to limit the embodiments of the application.

In a New Radio (NR) system, a network device may configure a Discontinuous Reception (DRX) function for a terminal device. The terminal device discontinuously monitors a PDCCH, so as to achieve the purpose of saving electricity for the terminal device. Each Medium Access Control (MAC) entity has one DRX configuration. The configuration parameters of the DRX include the following.

1) a DRX-onDuration Timer: the duration of a terminal device being awake at the beginning of a DRX cycle;
2) a DRX-SlotOffset: the time delay of the terminal device starting the DRX-onDuration Timer.
3) a DRX-InactivityTimer: after the terminal device receiving a PDCCH indicating uplink initial transmission or downlink initial transmission, a duration of the terminal device continuing monitoring the PDCCH.
4) a DRX-RetransmissionTimerDL: the longest duration of the terminal device monitoring the PDCCH indicating downlink retransmission scheduling. Except for a broadcast Hybrid Automatic Repeat Request (HARQ) processes, each downlink HARQ process corresponds to one respective DRX-Retransmission TimerDL.
5) a DRX-RetransmissionTimerDL: the longest duration of the terminal device monitoring the PDCCH indicating Upper retransmission scheduling. Each uplink HARQ process corresponds to one respective DRX-Retransmission-TimerUL.
6) a DRX-LongCycleStartOffset: used to configure a Long DRX cycle, and a subframe offset at the beginning of the Long DRX Cycle and a Short DRX Cycle.
7) a DRX-ShortCycle, which is an optional configuration.
8) a DRX-ShortCycleTimer: the duration of the terminal device in the short DRX cycle (any PDCCH is not received), and is an optional configuration.
9) DRX-HARQ-RTT-TimerDL: the minimum waiting time of the terminal device expecting to receive the PDCCH indicating downlink scheduling. Except for the broadcast HARQ, each downlink HARQ process corresponding to one respective DRX-HARQ-RTT-TimerDL.
10) DRX-HARQ-RTT-TimerUL: the minimum waiting time of the terminal device expecting to receive the PDCCH indicating uplink scheduling. Each uplink HARQ process corresponding to one respective drx-HARQ-RTT-TimerDL.

If the terminal device is configured with DRX, then the terminal device needs to monitor the PDCCH at the DRX Active Time. A DRX Active Time includes several cases as follows.

1) Any of the following five timers is running: DRX-onDurationTimer, DRX-InactivityTimer, DRX-RetransmissionTimerDL, DRX-RetransmissionTimerUL, and ra-ContentionResolutionTimer.
2) A Scheduling Request (SR) is sent on a PUCCH and is in a pending state.
3) In a competition-based random access process, the terminal device has not received an initial transmission indicated by the PDCCH scrambled by a Cell Radio Network Temporary Identifier (C-RNTI) after successfully receiving a random access response.

A schematic diagram of the DRX cycle of the terminal device is as shown in FIG. 1. The terminal device determines the time for starting the drx-onDurationTimer according to whether the terminal device is in the Short DRX Cycle or the Long DRX Cycle. Specific provisions are as follows.

1) If the terminal device is in the Short DRX Cycle currently, and the current subframe satisfies [(SFN× 10)+subframe number] modulo (drx-ShortCycle)= (drx-StartOffset) modulo (drx-ShortCycle); or
2) If the terminal device is in the Long DRX Cycle curently, and the current subframe satisfies [(SFN×10)+ subframe number] modulo (drx-LongCycle)=drx-StartOffset:
the drx-onDurationTimer is started at a time after drx-SlotOffset slots from the current sub-frame.

In a related art, the Long DRX Cycle is configured by default, and the Short DRX Cycle is an optional configuration. For the terminal device configured with the Short DRX Cycle, there is a conversion mode between the Long DRX Cycle and the Short DRX Cycle.

When any one of the following conditions is satisfied, the terminal device uses the Short DRX Cycle: a drx-InactivityTimer is timeout and the terminal device receives a DRX Command MAC CE.

When any one of the following conditions is satisfied, the terminal device uses the Long DRX Cycle: a drx-ShortCycleTimer is timeout and the terminal device receives a Long DRX command MAC CE.

In an NR system, in order to support a multi-beam operation, the NR system adopts a beam management mechanism, and is used for an initial access, a control channel, a data channel, etc.

Figure 2:
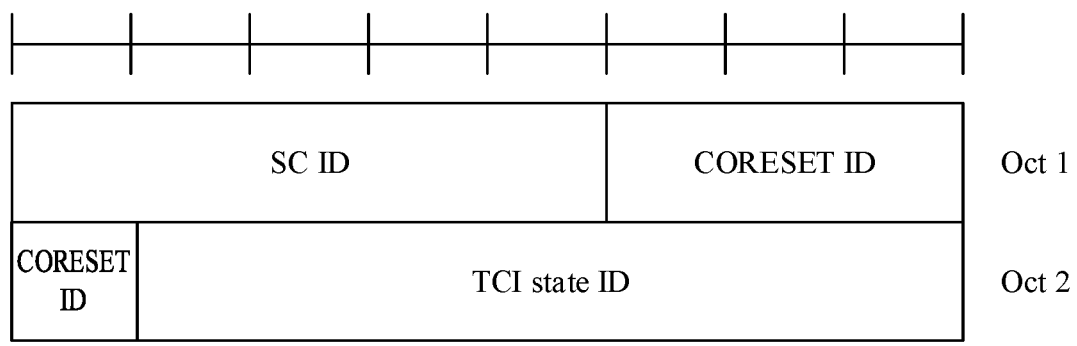
FIG. 2 illustrates a schematic diagram of a format of an Medium Access Control (MAC) Control Element (CE) indicated by a PDCCH Transmission Configuration Indicator (TCI) state of some embodiments of the application.

For the PDCCH, the network device may configure at most 12 Control Resource Sets in each Serving Cell (SC) for the terminal device, and meanwhile, configure a group of TCI states for each Control Resource Set to instruct the MAC CE to instruct the terminal device to activate one TCI state in one Control Resource Set. The schematic diagram of the format of the PDCCH TCI state instructing the MAC CE, as shown in FIG. 2, at least includes a SC Identity (ID), a TCI state ID, and a CORESET ID.

During a DRX process, the terminal device monitors all configured PDCCH search spaces during a period of a DRX active time, and stops monitoring all configured PDCCH search spaces during a period of DRX off. During the period of a DRX active time, the network device may indicate the terminal device to skip the PDCCH monitoring within a period of time. The PDCCH skipping indication may be carried in Downlink Control Information (DCI). After receiving the PDCCH skipping indication, the terminal device stops the PDCCH monitoring (that is, the PDCCH skipping) within an indicated time, and restores the PDCCH monitoring beyond the indicated time.

In a related art, in order to achieve the purpose of saving electricity for the terminal device, if the network device indicates the terminal device to perform PDCCH skipping, the PDCCH monitoring is stopped in all PDCCH search spaces configured for the terminal device. During implementing the abovementioned scheme, the applicant found that the terminal device stops monitoring the PDCCH in all PDCCH search spaces if the network device indicates the terminal device to perform the PDCCH skipping, which can save the electric energy of the terminal device, but does not facilitate a flexible scheduling service of the network device. On this basis, the applicant proposes that the network device uses different PDCCH search spaces for different service scheduling. For example, for a time delay sensitive service, network device uses more dense PDCCH search spaces in the configuration time domain. When the network device determines that part services do not have a scheduling requirement, the PDCCH search spaces corresponding to services without the scheduling requirement can temporarily not schedule the PDCCH. The terminal device may also stop monitoring these PDCCH search spaces, so as to achieve the purpose of saving the electricity for the terminal device. When the services have the scheduling requirement, the terminal device monitors the PDCCH in the PDCCH search space corresponding to the service with the scheduling requirement.

The technical schemes of the embodiments of the application may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, a Frequency Division Duplex (FDD) system, a Time Division Duplex (TDD) system, an Advanced Long Term Evolution (LTE-A) system, an NR system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Universal Mobile Telecommunication System (UMTS), a Worldwide Interoperability for Microwave Access (WiMAX) communications system, a Wireless Local Area Network (WLAN), Wireless Fidelity (WiFi), a next generation of communication systems, or other communication systems.

Network architecture and service scenarios described in the embodiments of the application are intended to describe the technical schemes in the embodiments of the application more clearly, but are not intended to limit the technical schemes provided in the embodiments of the application. Those of ordinary skill in the art may know that as the network architecture evolves and a new service scenario emerges, the technical schemes provided in the embodiments of the application are also applicable to a similar technical problem.

The network device involved in the embodiments of the application may be a common base station (NodeB or eNB or gNB), a New Radio controller (NR controller), a centralized unit, a new radio base station, a remote radio frequency module, a relay, a distributed network element, a transmission reception point (TRP), a transmission point (TP) or any other devices. No limits are made to specific technologies and specific device forms adopted by the network device in the embodiments of the application. In order to facilitate description, in all embodiments of the application, the abovementioned apparatuses with a wireless communication function provided for the terminal device are collectively referred to a network device.

In the embodiments of the application, the terminal device may be any terminal. For example, the terminal device may be a User Equipment (UE) in Machine Type Communication (MTC). That is to say, the terminal device may also be called the UE, a Mobile Station (MS), a Mobile Terminal (MT), a terminal, etc. The terminal device may communicate with one or more core networks through a Radio Access Network (RAN). For example, the terminal device may be a mobile terminal (or referred to as a "cellular" phone) and a computer with a mobile terminal. For example, the terminal device may also be a portable, pocket-sized, hand-held, computer built-in, or in-vehicle mobile apparatus, which exchanges language and/or data with the RAN. No specific limitations are made thereto in the embodiments of the application.

Optionally, the network device and the terminal device may be deployed on land, including indoors or outdoors, and may be held in hands or deployed in vehicles, or may be deployed on water, or may be deployed on an aircraft, a balloon, and an artificial satellite in the air. No limits are made to the application scenario of the network device and the terminal device in the embodiments of the application.

Optionally, communication may be performed between the network device and the terminal device and between the terminal devices through a licensed spectrum, or through an unlicensed spectrum, or through the licensed spectrum and the unlicensed spectrum simultaneously. Communication may be performed between the network device and the terminal device and between the terminal devices through a spectrum below 7 gigahertz (GHz), or through a spectrum above 7 GHz, or through the spectra below 7 GHz and above 7 GHz simultaneously. No limits are made to the spectrum resource used between the network device and the terminal device in the embodiments of the application.

Generally speaking, traditional communication systems support a limited number of connections and are easy to implement. However, with the development of the communication technology, mobile communication systems will not only support traditional communication, but also support, for example, Device to Device (D2D) communication, Machine to Machine (M2M) communication, MTC, and Vehicle to Vehicle (V2V) communication, etc. The embodiments of the application can also be applied to these communication systems.

Figure 3:
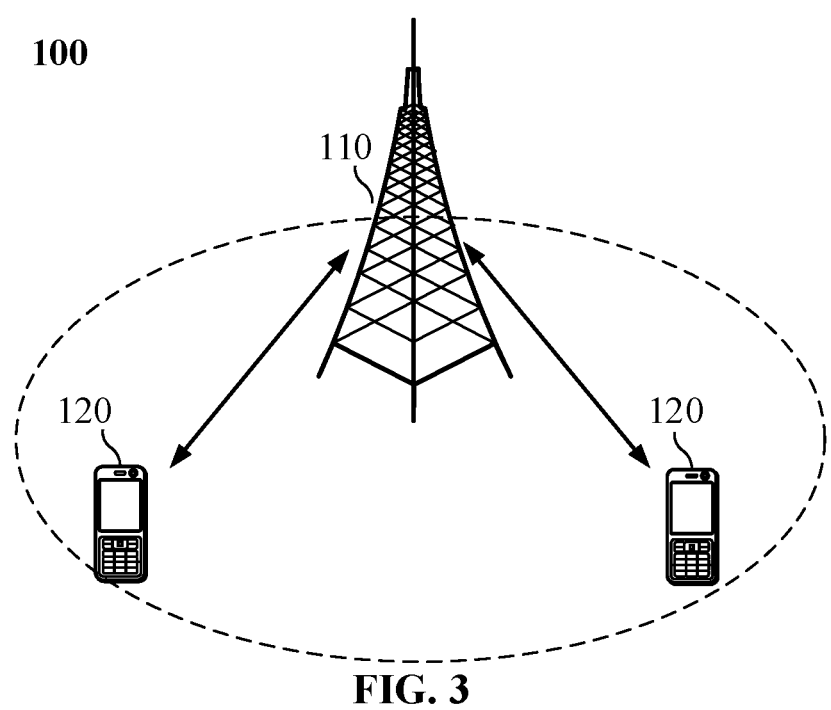
FIG. 3 illustrates a schematic structural diagram of compositions of a communication system of some embodiments of the application.

Exemplarily, the communication system 100 applied in the embodiments of the application is as shown in FIG. 3. The communication system 100 may include a network device 110. The network device 110 may be a device in communication with a terminal device 120 (or called a communication terminal device or a terminal). The network device 110 may provide communication coverage for a specific geographical area, and may communicate with the terminal device located within the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in a future 5G network, a network device in a future evolved Public Land Mobile Network (PLMN) or the like.

The communication system 100 further includes at least one terminal device 120 located within the coverage of the network device 110. A "terminal device" used herein includes, but not is limited to, an apparatus arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal device, and/or an Internet of Things (IoT) device. The terminal device arranged to communicate through a wireless interface may be called a "wireless communication terminal", a "wireless terminal" or a "mobile terminal". Examples of the mobile terminal include, but are not limited to, satellite or cellular phones, Personal Communications System (PCS) terminals that can combine cellular radiotelephones with data processing, fax, and data communication capabilities, PDAs that can include radiotelephones, pagers, Internet/Intranet access, Web browsers, notebooks, calendars, and/or Global Positioning System (GPS) receivers, and conventional laptop and/or hand-held receivers or other electronic devices including radiotelephone transceivers. The terminal device may also be referred to as UE, a subscriber unit, a subscriber station, a mobile console, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a Wireless Local Loop (WLL) station, a Personal Digital Assistant (PDA), a hand-held device having a wireless communication function, a computing device or another processing device connected to a wireless modem, an on-board device, a wearable device, a terminal device in a 5G network, a terminal device in a PLMN in future evolution, or the like.

Optionally, D2D communication may be performed between the terminal devices 120.

Optionally, a 5G system or a 5G network may also be called an NR system or an NR network.

FIG. 3 exemplarily illustrates one network device and two terminal devices. Optionally, the communication system 100 may include a plurality of network device and the coverage of each network device may include other number of terminal devices. No limits are made thereto in the embodiments of the application.

Optionally, the communication system 100 may further include other network entities, such as a network controller and a mobile management entity. No limits are made thereto in the embodiments of the application.

It is to be understood that a device with a communications function in a network/a system in the embodiments of the application may be called a communication device. Taking a communication system 100 as shown in FIG. 3, the communications device may include a network device 110 and a terminal device 120 with a communications function. The network device 110 and the terminal device 120 may be specific devices as described above, which will not be elaborated herein. The communication device 100 may also include other devices, for example, other network entities, such as a network controller and a mobile management entity. No limits are made thereto in the embodiments of the application.

Figure 4:
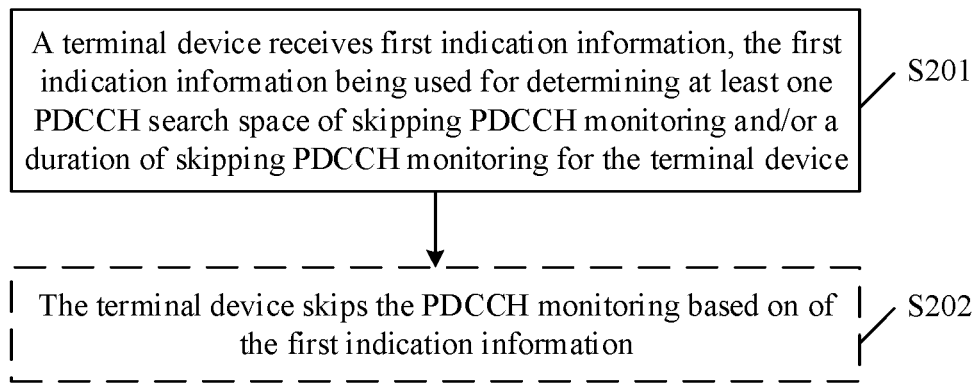
FIG. 4 illustrates an optional processing flowchart of a channel monitoring method of some embodiments of the application.

An optional processing flow of a channel monitoring method provided by the embodiments of the application, as shown in FIG. 4, includes the following operations.

At S201, a terminal device receives first indication information. The first indication information is used for determining at least one PDCCH search space of skipping PDCCH monitoring and/or a duration of skipping PDCCH monitoring for the terminal device.

In some embodiments, the first indication information may be carried in an MAC CE or DCI.

In some embodiments, the first indication information may include: at least one PDCCH search space Identity (ID), or at least one CORESET ID, or at least one currently activated PDCCH TCI state. The at least one PDCCH search space ID, the at least one CORESET ID, and the at least one currently activated PDCCH TCI state can all be used for determining the PDCCH search space. In embodiments of the present disclosure, the PDCCH search space determined by the first indication information may be a PDCCH search space corresponding to the PDCCH skipping of the terminal device.

In some embodiments, the first indication information may also includes a duration of skipping the PDCCH monitoring. Optionally, the duration of skipping the PDCCH monitoring may also be referred to as a PDCCH skipping duration.

At S202, the terminal device skips the PDCCH monitoring based on the first indication information.

In some embodiments, the terminal device determines the PDCCH search space and the PDCCH skipping duration corresponding to the PDCCH skipping according to the first indication information, and performs the PDCCH skipping in the determined PDCCH search space and PDCCH skipping duration.

The embodiments of the application are described in detail below for different contents included in the first indication information.

Figure 5:
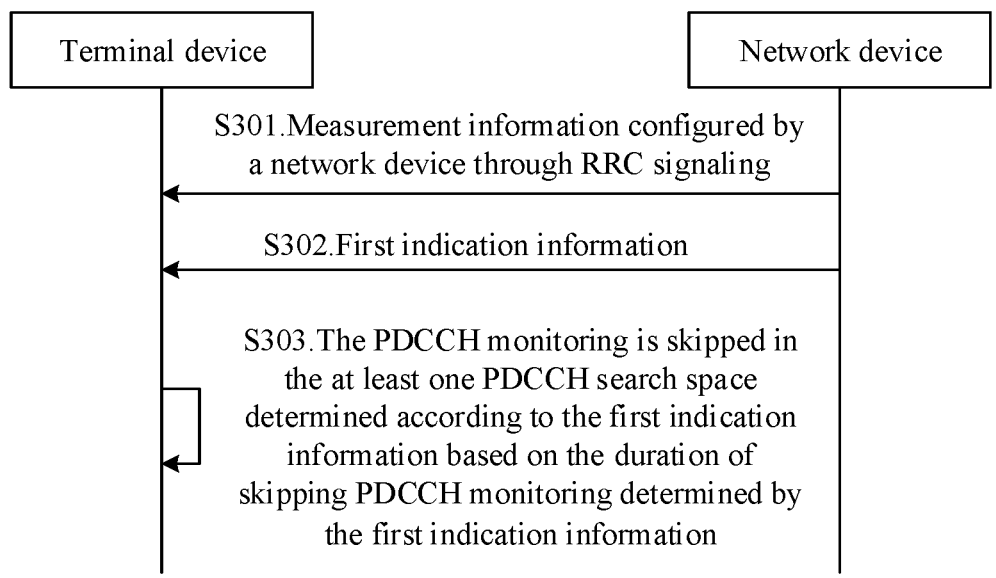
FIG. 5 illustrates an optional detailed processing flowchart of a channel encoding method of some embodiments of the application.

Taking the first indication information including at least one PDCCH search space ID as an example, a detailed optional processing flow of the channel monitoring method provided by the embodiments of the application, as shown in FIG. 5, includes the following operations.

At S301, a terminal device receives measurement information configured by a network device through RRC signaling.

In some embodiments, the measurement information is used for configuring related parameters of a DownLink Bandwidth Part (DL BWP).

In some embodiments, related parameters of the DL BWP may include:
1) PDCCH search space configuration: at most 10 PDCCH search spaces are configured for each DL BWP, and each PDCCH search space is associated with one CORESET configuration.
2) CORESET configuration: at most 3 CORESETs are configured for each DL BWP, and each CORESET configuration includes one group of TCI states.

At S302, the terminal device receives the first indication information sent by the network device.

In some embodiments, the first indication information includes at least one PDCCH search space ID and a PDCCH skipping duration.

In some embodiments, the first indication information may be carried in the MAC CE or DCI. Correspondingly, the MAC CE or DCI carrying the first indication information may also be referred to as a PDCCH skipping instruction.

In some embodiments, the PDCCH search space ID included in the first indication information is used for marking the PDCCH search space. For example, the PDCCH search space ID is equal to 1, it corresponds to a first PDCCH search space, the PDCCH search space ID is equal to 2, it corresponds to a second PDCCH search space, and so on. The number of the PDCCH search space IDs may be one or more.

In some embodiments, the first indication information may also include: a first bitmap. The first bitmap is configured to represent whether the terminal device skips the PDCCH monitoring in the PDCCH search space marked by the PDCCH search space ID included in the first indication information.

In some embodiments, the PDCCH search spaces marked according to an ascending sequence of the PDCCH search space IDs are sequentially matched according to a positive sequence of bits in the first bitmap. For example, the first bit in the first bitmap corresponds to the PDCCH search space with the PDCCH search space ID of 1, and the second bit in the first bitmap corresponds to the PDCCH search space with the PDCCH search space ID of 2, and so on. Taking a 10-bit first bitmap as an example, the first bit in the first bitmap corresponds to the PDCCH search space with the PDCCH search space ID of 1, and the second bit in the first bitmap corresponds to the PDCCH search space with the PDCCH search space ID of 2, and so on.

Or, the PDCCH search spaces marked according to an ascending sequence of the PDCCH search space IDs are sequentially matched according to a reverse sequence of bits in the first bitmap. For example, the last bit in the first bitmap corresponds to the PDCCH search space with the PDCCH search space ID of 1, the second to the last bit in the first bitmap corresponds to the PDCCH search space with the PDCCH search space ID of 2, and so on. Taking a 10-bit first bitmap as an example, the tenth bit in the first bitmap corresponds to the PDCCH search space with the PDCCH search space ID of 1, and the ninth bit in the first bitmap corresponds to the PDCCH search space with the PDCCH search space ID of 2, and so on.

In some embodiments, in a case where the bit information of a first bit in the first bitmap is a first value, it represents that the terminal device skips the PDCCH monitoring in the PDCCH search space corresponding to the first bit; and in a case where the bit information of the first bit in the first bitmap is a second value, it represents that the terminal device performs the PDCCH monitoring in the PDCCH search space corresponding to the first bit. For example, the value of the first bit in the first bitmap is 0, it represents that the terminal device skips the PDCCH monitoring in the PDCCH search space corresponding to the first bit; and the value of the first bit in the first bitmap is 1, it represents that the terminal device performs the PDCCH monitoring in the PDCCH search space corresponding to the first bit.

In some other embodiments, in a case where the bit information of a first bit in the first bitmap is the first value, it represents that the terminal device performs the PDCCH monitoring in the PDCCH search space corresponding to the first bit; and in a case where the bit information in the first bitmap is the second value, it represents that the terminal device skips the PDCCH monitoring in the PDCCH search space corresponding to the first bit. For example, the value of the first bit in the first bitmap is 1, it represents that the terminal device skips the PDCCH monitoring in the PDCCH search space corresponding to the first bit; and in a case where the value of the first bit in the first bitmap is 0, it represents that the terminal device performs the PDCCH monitoring in the PDCCH search space corresponding to the first bit.

In some embodiments, the first indication information may also include a duration of skipping the PDCCH monitoring. Optionally, all of the PDCCH search spaces correspond to one duration of skipping the PDCCH monitoring, that is, the duration of skipping the PDCCH monitoring in each PDCCH search space is equal. Or, each PDCCH search space corresponds to one respective PDCCH skipping duration, that is, the PDCCH skipping is performed in the respective duration of skipping the PDCCH monitoring corresponding to each PDCCH search space.

At S303, the terminal device skips the PDCCH monitoring in the at least one PDCCH search space determined according to the first indication information based on the duration of skipping PDCCH monitoring determined by the first indication information.

In some embodiments, the terminal device restores PDCCH monitoring after the end of the duration of skipping PDCCH monitoring determined according to the first indication information.

Figure 6:
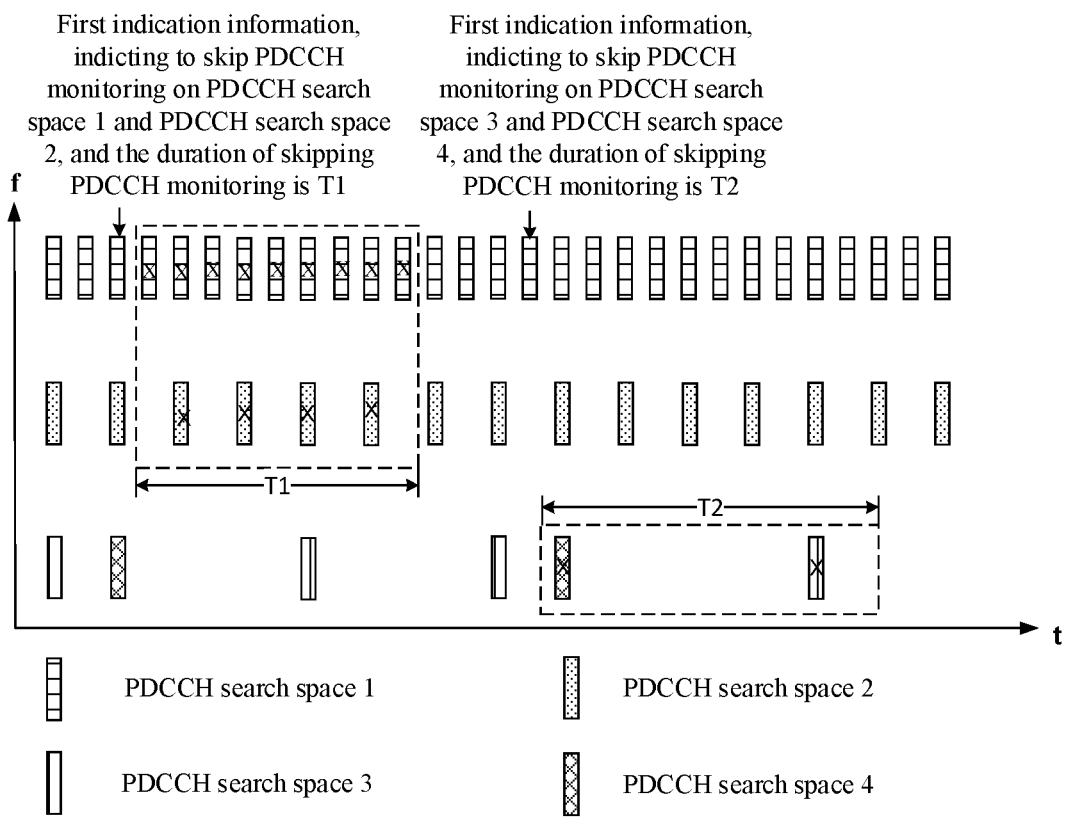
FIG. 6 illustrates a schematic diagram that a terminal device skips PDCCH monitoring of some embodiments of the application.

Based on the channel monitoring method as shown in FIG. 5, if the network device sends the first indication information to the terminal device to instruct the terminal device to perform PDCCH skipping in a PDCCH search space 1 and a PDCCH search space 2, the corresponding duration of skipping PDCCH monitoring being T1, the PDCCH search space 1 being associated with CORESET ID1, and the PDCCH search space 2 is associated with CORESET ID2; and it is indicated that the terminal device to perform PDCCH skipping in a PDCCH search space 3 and a PDCCH search space 4, the corresponding PDCCH skipping duration being T2, the PDCCH search space 3 being associated with CORESET ID3, and the PDCCH search space 4 being associated with CORESET ID4. A schematic diagram of a terminal device skipping PDCCH monitoring after receiving first indication information is as shown in FIG. 6. The terminal device performs the PDCCH skipping in the PDCCH search space 1 and the PDCCH search space 2 in the duration of T1. The terminal device performs the PDCCH skipping in the PDCCH search space 3 and the PDCCH search space 4 in the duration of T2.

Figure 7:
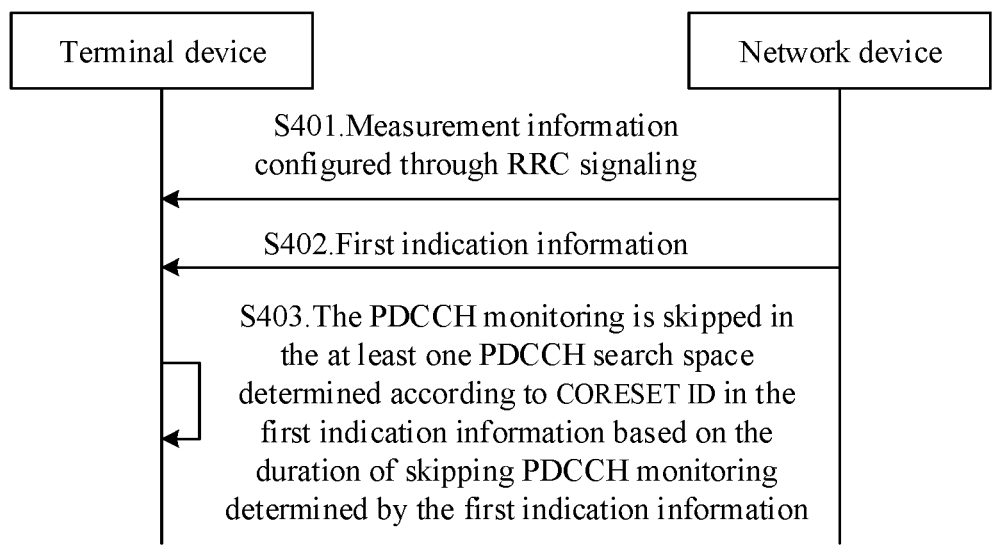
FIG. 7 illustrates another optional detailed processing flowchart of the channel monitoring method of some embodiments of the application.

Taking the first indication information including at least one CORESET ID as an example, another a detailed optional processing flow of the channel monitoring method provided by the embodiments of the application, as shown in FIG. 7, includes the following operations.

At S401, a terminal device receives measurement information configured by a network device through RRC signaling.

In some embodiments, the measurement information is used for configuring related parameters of a DL BWP.

In some embodiments, related parameters of the DL BWP may include the following.

1) PDCCH search space configuration: at most 10 PDCCH search spaces are configured for each DL BWP, and each PDCCH search space is associated with one respective CORESET configuration.

2) CORESET configuration: at most 3 CORESETs are configured for each DL BWP, and each CORESET configuration includes one group of TCI states.

At S402, the terminal device receives the first indication information sent by the network device.

In some embodiments, the first indication information includes at least one CORESET ID and a PDCCH skipping duration.

In some embodiments, the first indication information may be carried in the MAC CE or DCI. Correspondingly, the MAC CE or DCI carrying the first indication information may also be referred to as a PDCCH skipping instruction.

In some embodiments, the CORESET ID included in the first indication information is used for marking a CORESET. If the CORESET ID is equal to 1, it corresponds to a first CORESET, if the CORESET ID is equal to 2, it corresponds to a second CORESET, and so on. The number of the CORESET IDs may be one or more.

In some embodiments, the first indication information may further include: a second bitmap. The second bitmap represents whether the terminal device skips the PDCCH monitoring in the at least one PDCCH search space associated with the CORESET marked by the at least one CORESET ID. The PDCCH search space associated with the CORESET may be determined by the CORESET indicated by the PDCCH search space configured for the terminal device by the network device through the RRC signaling.

In some embodiments, the CORESETs marked according to an ascending sequence of the CORESET IDs are sequentially matched according to a positive sequence of bits in the second bitmap. For example, the first bit in the second bitmap corresponds to the CORESET with the CORESET ID of 1, and the second bit in the second bitmap corresponds to the CORESET with the CORESET ID of 2, and so on. Taking a 10-bit second bitmap as an example, the first bit in the second bitmap corresponds to the CORESET with the CORESET ID of 1, and the second bit in the second bitmap corresponds to the CORESET with the CORESET ID of 2, and so on.

Or, the CORESET marked according to an ascending sequence of the CORESET IDs are sequentially matched according to a reverse sequence of bits in the second bitmap. For example, the last bit in the second bitmap corresponds to the CORESET with the CORESET ID of 1, and the second to the last bit in the second bitmap corresponds to the CORESET with the CORESET ID of 2, and so on. Taking a 10-bit second bitmap as an example, the tenth bit in the first bitmap corresponds to the CORESET with the CORESET ID of 1, and the ninth bit in the second bitmap corresponds to the CORESET with the CORESET ID of 2, and so on.

In some embodiments, in a case where the bit information of a second bit in the second bitmap is a third value, it represents that the terminal device skips the PDCCH monitoring in the at least one PDCCH search space associated with the CORESET corresponding to the second bit; and in a case where the bit information of the second bitmap is a fourth value, it represents that the terminal device performs PDCCH monitoring in the at least one PDCCH search space associated with the CORESET corresponding to the second bit. For example, the value of the second bit in the second bitmap is 0, it represents that the terminal device skips the PDCCH monitoring in the at least one PDCCH search space associated with the CORESET corresponding to the second bit; the value of the second bit in the first bitmap is 1, it represents that the terminal device performs the PDCCH monitoring in the PDCCH search space associated with the CORESET corresponding to the first bit.

In some other embodiments, in a case where the bit information of a second bit in the second bitmap is a third value, it represents that the terminal device performs the PDCCH monitoring in the at least one PDCCH search space associated with the CORESET corresponding to the second bit; and in a case where the bit information in the second bitmap is a fourth value, it represents that the terminal device skips the PDCCH monitoring in the at least one PDCCH search space associated with the CORESET corresponding to the second bit. For example, the value of the second bit in the second bitmap is 0, it represents that the terminal device performs the PDCCH monitoring in the at least one PDCCH search space associated with the CORESET corresponding to the second bit; and the value of the second bit in the second bitmap is 1, it represents that the terminal device skips the PDCCH monitoring in the at least one PDCCH search space associated with the CORESET corresponding to the first bit.

In some embodiments, the first indication information may also include a duration of skipping the PDCCH monitoring. Optionally, each PDCCH search space corresponds to one respective duration of skipping PDCCH monitoring, that is, the duration of skipping PDCCH monitoring of the terminal device in the PDCCH search space is the duration of skipping PDCCH monitoring corresponding to the CORESET associated with the PDCCH search space. Or, all of the CORESETs correspond to one duration of skipping PDCCH monitoring.

At S403, the terminal device skips the PDCCH monitoring in the at least one PDCCH search space determined according to CORESET ID in the first indication information based on the duration of skipping PDCCH monitoring determined by the first indication information.

In some embodiments, the terminal device first determines the CORESET that needs to skip the PDCCH monitoring according to the first indication information after receiving the first indication information. Then, a PDCCH search space associated with the CORESET in the first indication information is acquired according to the CORESET indicated in the PDCCH search space configured by PDCCH signaling configured by the network device through the RRC signaling.

In some embodiments, the terminal device restores PDCCH monitoring after the end of the duration of skipping PDCCH monitoring determined according to the first indication information.

Figure 8:
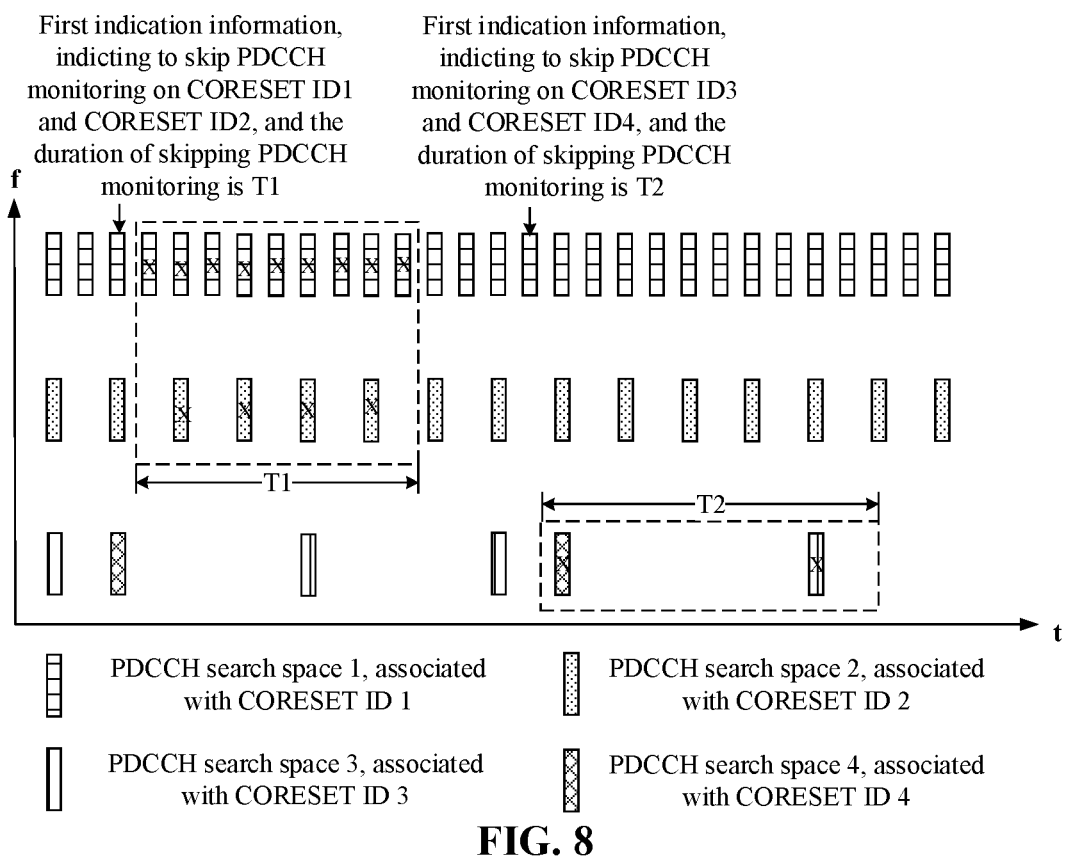
FIG. 8 illustrates another schematic diagram that the terminal device skips the PDCCH monitoring of some embodiments of the application.

Based on the channel monitoring method as shown in FIG. 7, if the network device sends the first indication information to the terminal device to instruct the terminal device to perform PDCCH skipping in a CORESET ID1 and a CORESET ID2, the corresponding PDCCH skipping duration being T1, the PDCCH search space 1 being associated with CORESET ID1, and the PDCCH search space 2 being associated with CORESET ID2; and the terminal device is instructed to perform PDCCH skipping in a CORESET ID3 and a CORESET ID4, the corresponding PDCCH skipping duration being T2, the PDCCH search space 3 being associated with CORESET ID3, and the PDCCH search space 4 being associated with CORESET ID4. Another schematic diagram of a terminal device skipping PDCCH monitoring after receiving first indication information is as shown in FIG. 8. The terminal device performs the PDCCH skipping in the PDCCH search space 1 and the PDCCH search space 2 in the duration of T1. The terminal device performs the PDCCH skipping in the PDCCH search space 3 and the PDCCH search space 4 in the duration of T2.

Figure 9:
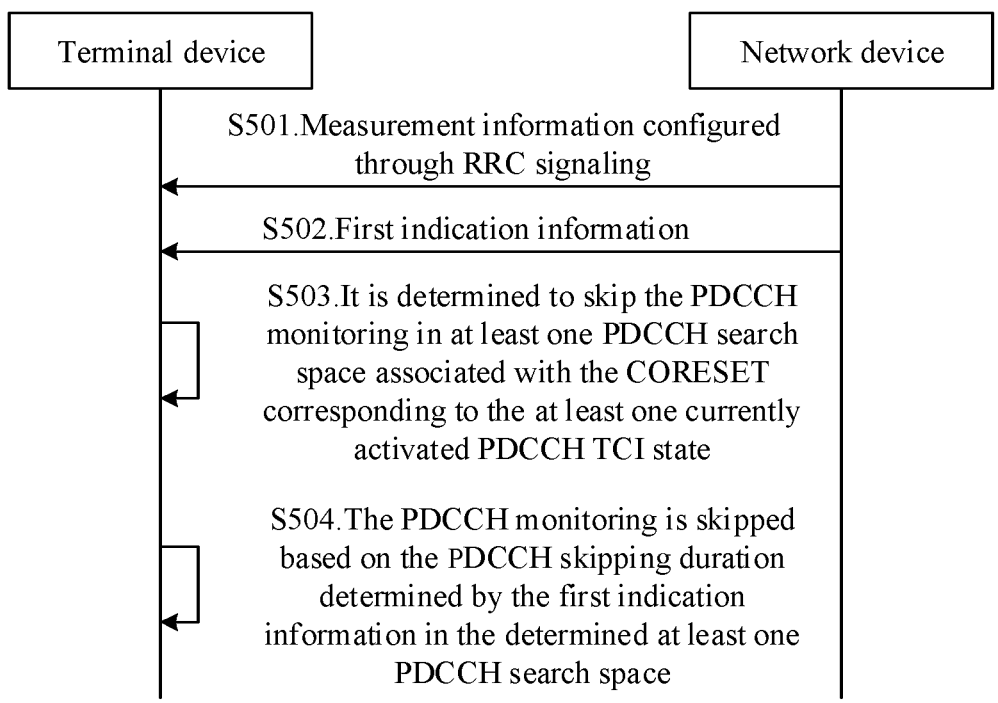
FIG. 9 illustrates yet another optional detailed processing flowchart of the channel encoding method of some embodiments of the application.

Taking the first indication information including at least one currently activated PDCCH TCI as an example, another detailed optional processing flow of the channel monitoring method provided by the embodiments of the application, as shown in FIG. 9, includes the following operations.

At S501, a terminal device receives measurement information configured by a network device through RRC signaling.

In some embodiments, the measurement information is used for configuring related parameters of a DL BWP.

In some embodiments, related parameters of the DL BWP may include:
1) PDCCH search space configuration: at most 10 PDCCH search spaces are configured for each DL BWP, and each PDCCH search space is associated with one respective CORESET configuration.
2) CORESET configuration: at most 3 CORESETs are configured for each DL BWP, and each CORESET configuration includes one group of TCI states.

At S502, the terminal device receives the first indication information sent by the network device.

In some embodiments, the first indication information includes at least one currently activated PDCCH TCI state and a PDCCH skipping duration.

In some embodiments, the first indication information may be carried in the MAC CE or DCI. Correspondingly, the MAC CE or DCI carrying the first indication information may also be referred to as a PDCCH skipping instruction.

At S503, the terminal device determines to skip the PDCCH monitoring in at least one PDCCH search space associated with the CORESET corresponding to the at least one currently activated PDCCH TCI state.

In some embodiments, the first indication information includes one CORESET corresponding to the at least one currently activated PDCCH TCI state, and each CORESET is associated with the at least one PDCCH search space. Therefore, the terminal device may determine at least one CORESET and the PDCCH search space associated with the determined CORESET according to the currently activated PDCCH TCI state carried in the first indication information.

The PDCCH search space associated with the CORESET may be determined by the CORESET indicated by the PDCCH search space configured by the network device through the RRC signaling.

At S504, the terminal device skips the PDCCH monitoring in the at least one PDCCH search space based on the duration of skipping PDCCH monitoring determined by the first indication information.

In some embodiments, the terminal device restores PDCCH monitoring after the end of the duration of skipping PDCCH monitoring determined according to the first indication information.

In various embodiments of the application, the first indication information includes at least one PDCCH search space ID, or at least one CORESET ID, or at least one currently activated PDCCH TCI state, so that the terminal device can directly determine at least one PDCCH search space according to the first indication information, or acquire at least one PDCCH search space associated with the at least one CORESET ID according to the at least one CORESET ID, or acquire at least one PDCCH search space associated with the CORESET corresponding to the currently activated PDCCH TCI state. The terminal device performs PDCCH skipping in the at least one PDCCH search space determined by the first indication information, which can not only reduce the power consumption and the electric energy of the terminal device, but also give consideration to the scheduling requirements of the network device on different services by monitoring the PDCCH in part PDCCH search spaces for transmitting a specific service, so as to realize flexible scheduling of the network device to the service.

It should be understood that, in various embodiments of the application, sequence numbers of the abovementioned processes do not mean execution sequences. The execution sequences of various processes should be determined according to functions and internal logic of the processes, and should not be construed as any limitation on the implementation processes of the embodiments of the application.

Figure 10:
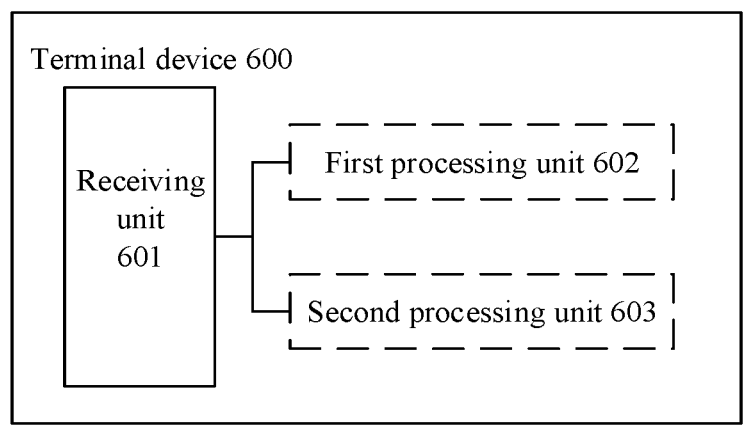
FIG. 10 illustrates an optional schematic structural diagram of compositions of a terminal device of some embodiments of the application.

In order to implement the abovementioned channel monitoring method, the embodiments of the application provide a terminal device. A schematic diagram of an optional composition structure of the terminal device 600, as shown in FIG. 10, includes a receiving unit 601.

The receiving unit 601 is configured to receive first indication information. The first indication information is used for determining at least one PDCCH search space of skipping PDCCH monitoring and/or a duration of skipping PDCCH monitoring for the terminal device.

In some embodiments, the terminal device 600 further includes a first processing unit 602.

The first processing unit 602 is configured to skip the PDCCH monitoring based on the first indication information.

In some embodiments, the first processing unit 602 is configured to skip the PDCCH monitoring in the at least one PDCCH search space and the duration of skipping PDCCH monitoring determined based on the first indication information.

In some embodiments, the first indication information includes at least one PDCCH search space ID.

In some embodiments, the first indication information further includes: a first bitmap, and the first bitmap represents whether the terminal device skips the PDCCH monitoring in at least one PDCCH search space marked by the at least one PDCCH search space ID.

In some embodiments, in a case whether the bit information of a first bit in the first bitmap is a first value, it represents that the terminal device skips the PDCCH monitoring in the PDCCH search space corresponding to the first bit; and in a case where the bit information of the first bit in the first bitmap is a second value, it represents that the terminal device performs the PDCCH monitoring in the PDCCH search space corresponding to the first bit.

Optionally, in a case where the bit information of the first bit in the first bitmap is the first value, it represents that the terminal device performs the PDCCH monitoring in the PDCCH search space corresponding to the first bit; and in a case where the bit information in the first bitmap is the second value, it represents that the terminal device skips the PDCCH monitoring in the PDCCH search space corresponding to the first bit.

In some embodiments, the PDCCH search spaces marked according to an ascending sequence of the PDCCH search space IDs are sequentially matched according to a positive sequence of bits in the first bitmap; or, the PDCCH search spaces marked according to an ascending sequence of the PDCCH search space IDs are sequentially matched according to a reverse sequence of the bits in the first bitmap.

In some embodiments, each PDCCH search space corresponds to one respective duration of skipping PDCCH monitoring; or, all of the PDCCH search spaces correspond to one duration of skipping PDCCH monitoring;

In some embodiments, the first indication information includes: at least one CORESET ID.

In some embodiments, the first indication information further includes: a second bitmap. The second bitmap represents whether the terminal device skips the PDCCH monitoring in the at least one PDCCH search space associated with the CORESET marked by the at least one CORESET ID.

In some embodiments, in a case where the bit information of a second bit in the second bitmap is a third value, it represents that the terminal device skips the PDCCH monitoring in at least one PDCCH search space associated with the CORESET corresponding to the second bit; and in a case where the bit information in the second bitmap is a fourth value, it represents that the terminal device performs the PDCCH monitoring in the at least one PDCCH search space associated with the CORESET corresponding to the second bit.

Optionally, in a case where the bit information of a second bit in the second bitmap is the third value, it represents that the terminal device performs the PDCCH monitoring in the at least one PDCCH search space associated with the CORESET corresponding to the second bit; and in a case where the bit information in the second bitmap is the fourth value, it represents that the terminal device skips the PDCCH monitoring in the at least one PDCCH search space associated with the CORESET corresponding to the second bit.

In some embodiments, the CORESETs marked according to an ascending sequence of the CORESET IDs are sequentially matched according to a positive sequence of bits in the second bitmap; or, the CORESETs marked according to an ascending sequence of the CORESET IDs are sequentially matched according to a reverse sequence of the bits in the second bitmap.

In some embodiments, the CORESET corresponding to each PDCCH search space corresponds to one respective duration of skipping PDCCH monitoring or, all CORESETs associated with all of the PDCCH search spaces correspond to one duration of skipping PDCCH monitoring.

In some embodiments, the first indication information includes: at least one currently activated PDCCH TCI state.

In some embodiments, the terminal device 600 further includes a second processing unit 603.

The second processing unit 603 is configured to determine to skip the PDCCH monitoring in at least one PDCCH search space associated with the CORESET corresponding to the at least one currently activated TCI state.

In some embodiments, each PDCCH search space associated with the CORESET corresponding to the at least one currently activated TCI state corresponds to one respective duration of skipping PDCCH monitoring; or the all PDCCH search spaces associated with the CORESET corresponding to the at least one currently activated TCI state corresponds to one duration of skipping PDCCH monitoring.

In some embodiments, the PDCCH search space associated with the CORESET is configured through RRC signaling.

In some embodiments, the first indication information is carried in an MAC CE or DCI.

Figure 11:
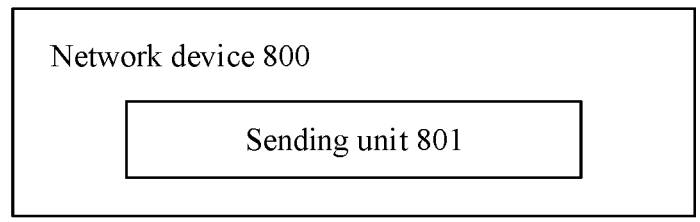
FIG. 11 illustrates an optional schematic structural diagram of compositions of a network device of some embodiments of the application.

In order to implement the abovementioned channel monitoring method, the embodiments of the application provide a network device. A schematic diagram of an optional composition structure of the network device 800, as shown in FIG. 11, includes a sending unit 801.

The sending unit 801 is configured to send first indication information. The first indication information is used for determining at least one PDCCH search space of skipping PDCCH monitoring and/or a duration of skipping PDCCH monitoring for the terminal device.

In some embodiments, the first indication information includes at least one PDCCH search space ID.

In some embodiments, the first indication information further includes: a first bitmap, and the first bitmap represents whether the terminal device skips the PDCCH monitoring in at least one PDCCH search space marked by the at least one PDCCH search space ID.

In some embodiments, in a case whether the bit information of a first bit in the first bitmap is a first value, it represents that the terminal device skips the PDCCH monitoring in the PDCCH search space corresponding to the first bit; and in a case where the bit information of the first bit in the first bitmap is a second value, it represents that the terminal device performs the PDCCH monitoring in the PDCCH search space corresponding to the first bit.

Optionally, in a case where the bit information of the first bit in the first bitmap is the first value, it represents that the terminal device performs the PDCCH monitoring in the PDCCH search space corresponding to the first bit; and in a case where the bit information in the first bitmap is the second value, it represents that the terminal device skips the PDCCH monitoring in the PDCCH search space corresponding to the first bit.

In some embodiments, the PDCCH search spaces marked according to an ascending sequence of the PDCCH search space IDs are sequentially matched according to a positive sequence of bits in the first bitmap; or, the PDCCH search spaces marked according to an ascending sequence of the PDCCH search space IDs are sequentially matched according to a reverse sequence of the bits in the first bitmap.

In some embodiments, each PDCCH search space corresponds to one respective duration of skipping PDCCH monitoring; or, all of the PDCCH search spaces correspond to one duration of skipping PDCCH monitoring.

In some embodiments, the first indication information includes: at least one CORESET ID.

In some embodiments, the first indication information further includes: a second bitmap. The second bitmap represents whether the terminal device skips the PDCCH monitoring in the at least one PDCCH search space associated with the CORESET marked by the at least one CORESET ID.

In some embodiments, in a case where the bit information of a second bit in the second bitmap is a third value, it represents that the terminal device skips the PDCCH monitoring in at least one PDCCH search space associated with the CORESET corresponding to the second bit; and in a case where the bit information in the second bitmap is a fourth value, it represents that the terminal device performs the PDCCH monitoring in the at least one PDCCH search space associated with the CORESET corresponding to the second bit.

Optionally, in a case where the bit information of a second bit in the second bitmap is the third value, it represents that the terminal device performs the PDCCH monitoring in the at least one PDCCH search space associated with the CORESET corresponding to the second bit; and in a case where the bit information in the second bitmap is the fourth value, it represents that the terminal device skips the PDCCH monitoring in the at least one PDCCH search space associated with the CORESET corresponding to the second bit.

In some embodiments, the CORESETs marked according to an ascending sequence of the CORESET IDs are sequentially matched according to a positive sequence of bits in the second bitmap; or, the CORESETs marked according to an ascending sequence of the CORESET IDs are sequentially matched according to a reverse sequence of the bits in the second bitmap.

In some embodiments, the CORESET corresponding to each PDCCH search space corresponds to one respective duration of skipping PDCCH monitoring; or, all CORESETs associated with all of the PDCCH search spaces correspond to one duration of skipping PDCCH monitoring.

In some embodiments, the first indication information includes: at least one currently activated PDCCH TCI state.

In some embodiments, each PDCCH search space associated with the CORESET corresponding to the at least one currently activated TCI state corresponds to one respective duration of skipping PDCCH monitoring.

Optionally, all PDCCH search spaces associated with the CORESET corresponding to the at least one currently activated TCI state corresponds to one duration of skipping PDCCH monitoring.

In some embodiments, the PDCCH search space associated with the CORESET is configured through RRC signaling.

In some embodiments, the first indication information is carried in an MAC CE or DCI.

The embodiments of the application further provide a terminal device, which includes a processor and a memory configured to store a computer program that can run on the processor. The processor is configured to execute the operations of the channel monitoring method executed by the abovementioned terminal device when running the computer program.

The embodiments of the application further provide a network device, which includes a processor and a memory configured to store a computer program that can run on the processor. The processor is configured to execute the operations of the channel monitoring method executed by the abovementioned network device when running the computer program.

The embodiments of the application further provides a chip, which may include a processor, configured to call and run a computer program in a memory to enable a device installed with the chip to execute the channel monitoring method executed by the abovementioned terminal device.

The embodiments of the application further provides a chip, which may include a processor, configured to call and run a computer program in a memory to enable a device installed with the chip to execute the channel monitoring method executed by the abovementioned network device.

The embodiments of the application further provide a storage medium, which stores an executable program. The executable program implements the channel monitoring method executed by the abovementioned terminal device when being executed by a processor.

The embodiments of the application further provide a storage medium, which stores an executable program. The executable program implements the channel monitoring method executed by the abovementioned network device when being executed by a processor.

An embodiment of the application further provides a computer program product, including computer program instructions. The computer program instructions enable a computer to execute the channel monitoring method executed by the abovementioned terminal device.

An embodiment of the application further provides a computer program product, including computer program instructions. The computer program instructions enable a computer to execute the channel monitoring method executed by the abovementioned network device.

An embodiment of the application further provides a computer program. The computer program enables a computer to execute the channel monitoring method executed by the abovementioned terminal device.

An embodiment of the application further provides a computer program. The computer program enables a computer to execute the channel monitoring method executed by the abovementioned network device.

Figure 12:
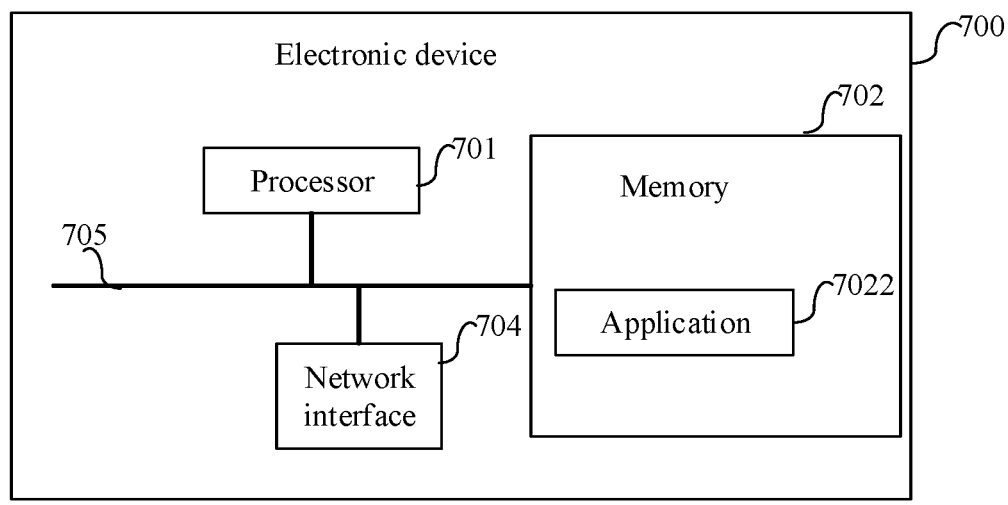
FIG. 12 illustrates a schematic hardware diagram of hardware compositions of an electronic device of some embodiments of the application.

FIG. 12 illustrates a schematic structural diagram of hardware compositions of an electronic device (terminal device or network device) of an embodiment of the application. The electronic device 700 includes: at least one processor 701, a memory 702 and at least one network interface 704. Various components of the electronic device 700 are coupled together through a bus system 705. It can be understood that the bus system 705 is used to implement connection and communication between these components. In addition to a data bus, the bus system 705 further includes a power bus, a control bus, and a status signal bus. However, for clarity of description, various buses are marked as the bus system 705 in FIG. 12.

It is to be understood that the memory 702 may be a volatile memory or a non-volatile memory, or may include both a volatile memory and a non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk or a Compact Disc Read-Only Memory (CD-ROM); and the magnetic surface memory may be a magnetic disk memory or a magnetic tape memory. The volatile memory may be a RAM that acts as an external cache. By way of example and not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiment of the application is intended to include, but is not limited to, these and any other suitable types of memories.

The memory 702 in the embodiment of the application is configured to store various types of data to support operation of the electronic device 700. Examples of such data include:

any computer application operated on the electronic device 700, such as an application 7022. A program for implementing the method in the embodiment of the application may be included in the application program 7022.

The method disclosed in the abovementioned embodiment of the application may be applied to the processor 701, or may be implemented by the processor 701. The processor 701 may be an integrated circuit chip with signal processing capability. During implementation, the operations of the foregoing method can be completed by hardware integrated logic circuits in the processor 701 or instructions in the form of software. The abovementioned processor 701 may be a general-purpose processor, a Digital Signal Processor (DSP), or other programmable logic devices, discrete gate or transistor logic devices, discrete hardware components, or the like. The processor 701 may implement or execute various methods, operations, and logical block diagrams disclosed in the embodiments of the application. The general-purpose processor may be a microprocessor, or any conventional processor. Operations of the methods disclosed with reference to the embodiments of the application may be directly performed and accomplished by a hardware decoding processor, or may be performed and accomplished by a combination of hardware and software modules in the decoding processor. A software module may be located in a storage medium. The storage medium is located in the memory 702, and the processor 701 reads information in the memory 702 and completes the operations of the foregoing method in combination with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic elements for executing the foregoing methods.

The present application is described with reference to flowcharts and/or block diagrams of the method, the device (system) and the computer program product according to the embodiments of the present application. It is to be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation operations on the computers or the other programmable devices, and therefore the instructions executed on the computers or the other programmable devices provide a step of achieving the functions designated in one or more flows of the flowcharts and/or one or more blocks of the block diagrams.

It should be understood that the terms "system" and "network" in the application are often used interchangeably herein. The term "and/or" in this application describes only an association relationship for describing associated objects and represents that three relationships may exist. For example, A and/or B may represent the following three cases: only A exists, both A and B exist, and only B exists. In addition, the character "/" in the application generally indicates an "or" relationship between the associated objects.

The description above is only the preferred embodiment of the application and is not intended to limit the scope of protection of the application. Any modifications, equivalent replacements, improvements and the like made within the spirit and principle of the application shall fall within the scope of protection of the application.

The invention claimed is:

1. A channel monitoring method, comprising:
receiving, by a terminal device, first indication information, wherein the first indication information is used for determining at least one of following: at least one Physical Downlink Control Channel (PDCCH) search space of skipping PDCCH monitoring for the terminal device and a duration of skipping PDCCH monitoring for the terminal device,
wherein the first indication information comprises at least one PDCCH search space Identity (ID) and a first bitmap, and the first bitmap represents whether the terminal device skips the PDCCH monitoring in at least one PDCCH search space marked by the at least one PDCCH search space ID.

2. The method of claim 1, further comprising:
skipping, by the terminal device, PDCCH monitoring based on the first indication information.

3. The method of claim 2, wherein the skipping, by the terminal device, the PDCCH monitoring based on the first indication information comprises:
skipping, by the terminal device, the PDCCH monitoring in the at least one PDCCH search space and the duration of skipping PDCCH monitoring determined based on the first indication information.

4. The method of claim 1, wherein in a case where bit information of a first bit in the first bitmap is a first value, the first bitmap represents that the terminal device skips the PDCCH monitoring in a PDCCH search space corresponding to the first bit; and in a case where the bit information of the first bit in the first bitmap is a second value, the first bitmap represents that the terminal device performs the PDCCH monitoring in the PDCCH search space corresponding to the first bit;
or, in a case where the bit information of the first bit in the first bitmap is the first value, the first bitmap represents that the terminal device performs the PDCCH monitoring in the PDCCH search space corresponding to the first bit; and in a case where the bit information in the first bitmap is the second value, the first bitmap represents that the terminal device skips the PDCCH monitoring in the PDCCH search space corresponding to the first bit.

5. The method of claim 1, wherein each of the at least one PDCCH search space corresponds to one respective duration of skipping PDCCH monitoring;

or, all of the at least one PDCCH search space correspond to one duration of skipping PDCCH monitoring.

6. The method of claim 1, wherein the CORESET associated with each of the at least one PDCCH search space corresponds to one respective duration of skipping PDCCH monitoring;
or, all CORESETs associated with all of the at least one PDCCH search space correspond to one duration of skipping PDCCH monitoring.

7. The method of claim 1, wherein the first indication information is carried in a Medium Access Control (MAC) Control Element (CE) or Downlink Control Information (DCI).

8. A channel monitoring method, comprising:
sending, by a network device, first indication information, wherein the first indication information is used for determining at least one of following: at least one PDCCH search space of skipping PDCCH monitoring for a terminal device and a duration of skipping PDCCH monitoring for the terminal device,
wherein the first indication information comprises at least one PDCCH search space Identity (ID) and a first bitmap, and the first bitmap represents whether the terminal device skips the PDCCH monitoring in at least one PDCCH search space marked by the at least one PDCCH search space ID.

9. The method of claim 8, wherein each of the at least one PDCCH search space corresponds to one respective duration of skipping PDCCH monitoring;
or, all of the at least one PDCCH search space correspond to one duration of skipping PDCCH monitoring.

10. The method of claim 8, wherein the first indication information is carried in a MAC CE or DCI.

11. A terminal device, comprising a processor and a memory configured to store instructions that can be executed by the processor, wherein the processor is configured to execute the instructions to perform at least one operation comprising:
receiving first indication information, wherein the first indication information is used for determining at least one of following: at least one PDCCH search space of skipping PDCCH monitoring for the terminal device and a duration of skipping PDCCH monitoring for the terminal device,
wherein the first indication information comprises at least one PDCCH search space Identity (ID) and a first bitmap, and the first bitmap represents whether the terminal device skips the PDCCH monitoring in at least one PDCCH search space marked by the at least one PDCCH search space ID.

12. The terminal device of claim 11, wherein the at least one operation further comprises:
skipping PDCCH monitoring based on the first indication information.

13. The terminal device of claim 12, wherein the operation of skipping, by the terminal device, the PDCCH monitoring based on the first indication information comprises:
skipping the PDCCH monitoring in the at least one PDCCH search space and the duration of skipping PDCCH monitoring determined based on the first indication information.

14. The terminal device of claim 11, wherein each of the at least one PDCCH search space corresponds to one respective duration of skipping PDCCH monitoring PDCCH skipping duration;
or, all of the at least one PDCCH search space correspond to one duration of skipping PDCCH monitoring.

15. The terminal device of claim 11, wherein the first indication information is carried in a MAC CE or DCI.

* * * * *